UNITED STATES PATENT OFFICE.

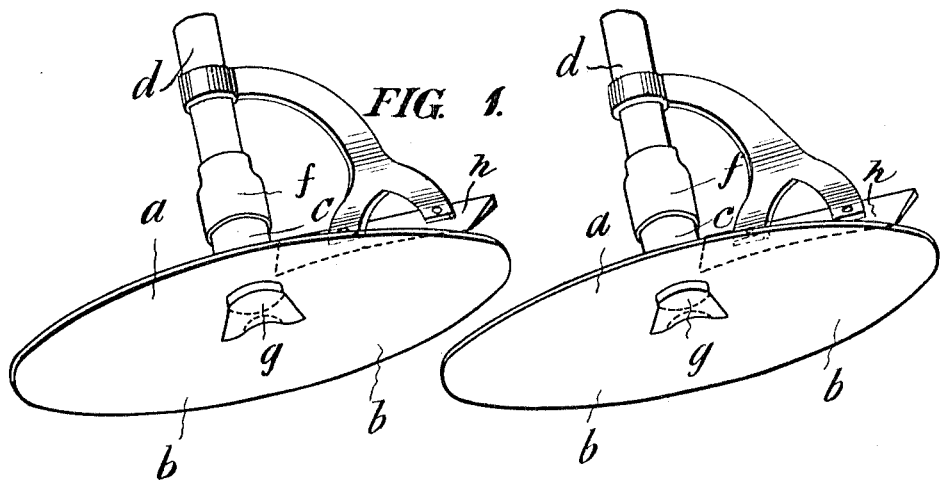
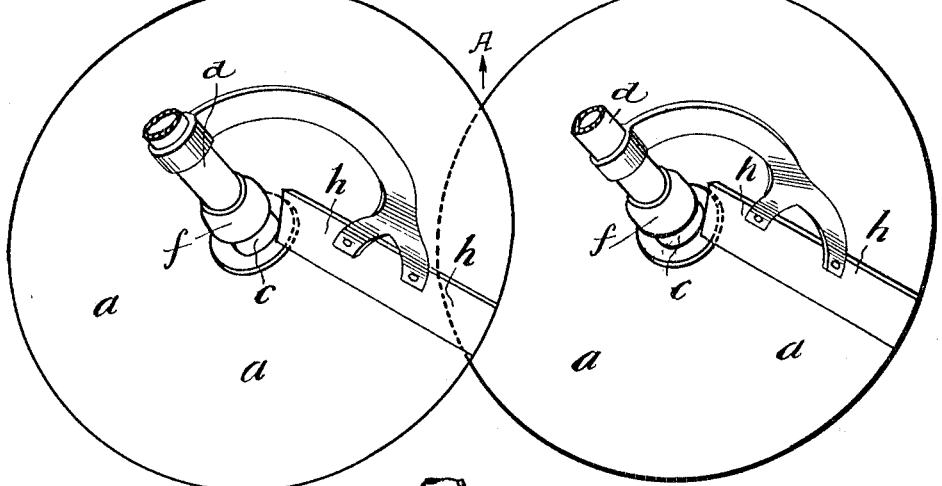
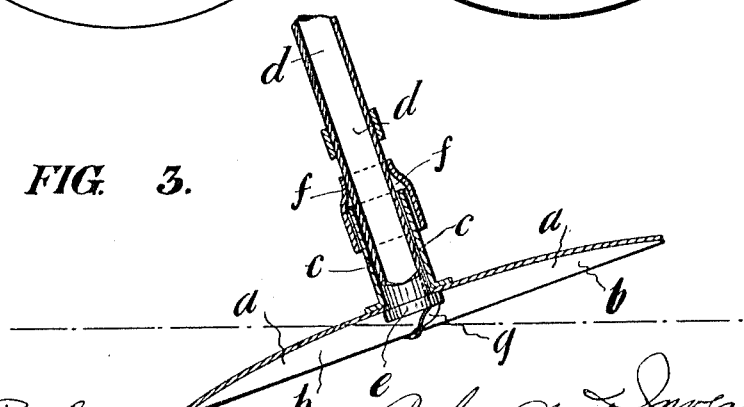

RICHARD N. LEA, OF MANITOU, MANITOBA, CANADA, AND FREDERICK MACKENZIE LEA, OF BIRMINGHAM, ENGLAND.

SEED OR LIKE DRILL.

1,105,570.  Specification of Letters Patent.  Patented July 28, 1914.

Application filed October 3, 1912. Serial No. 723,800.

*To all whom it may concern:*

Be it known that we, RICHARD NATHANIEL LEA and FREDERICK MACKENZIE LEA, subjects of the King of Great Britain, residing at Fairbrook Farm, Manitou, Manitoba, Canada, farmer, and 38 Bennetts Hill, Birmingham, England, engineer, respectively, have invented certain new and useful Improvements in Seed or like Drills, of which the following is a specification.

Our invention relates to seed or like drills in which the seed is buried in the ground by means of disks.

Disk drills have before been proposed having a number of disks mounted on substantially horizontal axes so that they sink into the soil to a determined extent and are thereby caused to revolve around their axes as the drill is moved along. These disks are usually arranged in pairs, each disk however being on a separate stud shaft, which shafts are inclined to each other so that the leading edges of each pair of disks are closer together than are the rear edges. A seed spout is provided which delivers seed into the wider space between the disks, and the seed then drops into the bottom of the furrow formed by the disks. By using this drill the seeds are caused to lie too closely together in the furrows, with the result that they hamper and impede each other during their subsequent growth.

The object of our present invention is to provide a drill by means of which the seeds are sown broadcast or scattered underground, in contra-distinction to the previous method of sowing in furrows, so that each seed has sufficient space to expand and develop without being hampered or impeded by the adjacent seeds or plants.

In the appended drawing: Figure 1 is an elevation of two disks looking from the rear of the machine. Fig. 2 is a plan view of the disks shown in Fig. 1. Fig. 3 shows a vertical sectional view of one of the disks.

In carrying out our invention we provide a suitable number of disks *a*. In one construction of our drill we employ twenty of such disks but the number of these may be varied as desired. Each of these disks is preferably formed concave on the underside as at *b*, and is provided with a tubular sleeve *c*, which projects from the upper face of the disk. This tubular projection surrounds a central tube *d* and is free to rotate on said tube, the disk being retained on the tube *d* by means of the collar *e* on the end of the said tube. This tube *d* is attached at its upper end to the usual mechanical apparatus for feeding down the seed at the requisite rate and leads the seed to the underside of the disk *a*. Covering and inclosing the top of the sleeve *c*, we provide a cylindrical cap or shield *f* which is secured to the tube or seed spout *d* to prevent the soil from getting in between the sleeve and the seed spout.

To the collar *e* on the tube *d* is attached a small deflector or chute *g*, somewhat similar to that used on the ordinary broadcast surface seeder; as shown this deflector *g* inclines downward and as the seeds fall through the tube or seed spout *d* onto this deflector they are deflected and scattered underneath the disk *a* toward the leading edge of the same. The axis of each disk *a* is not vertical, but is inclined in plan, preferably about 40° from the line of direction in which the drill is being drawn, and in elevation about 70° from the ground line, the leading edge of the disk being the lowest. These angles may be varied according to requiremens and we may provide means so that the angles can be readily adjusted by the operator. The disks are not arranged in pairs, as is the case in the ordinary disk drill but each acts singly and independently. Transversely to the line of draft as indicated by the arrow at A the disks overlap each other, as will be seen from Fig. 2, to such an extent that the spread of seeds from the first disk lies parallel with, and adjacent to, the spread of seeds from the second disk, and so on from disk to disk across the whole face of the drill. In order to prevent side draft, one half of the disks are inclined to the right, and the other half to the left of their respective fore and aft center lines. Thus in a drill provided with twenty disks the left-hand group of ten disks would be inclined say to the right, and the right-hand group to the left, or vice versa.

The action of our invention is as follows: When the drill is drawn forwards over the land to be sown, the leading edges of the disks *a* enter the ground. Owing to the inclination of their axes from the line of direction in which the drill is drawn, the pressure of the soil causes the disks *a* to revolve, and owing to their concave shape and their plane of rotation, a cavity is formed underneath each of them into which the seed is projected from the deflector $g$. The deflector or spreader $g$ spreads the seed evenly across the cavity thus formed, and the soil which has been raised falls off the rear edge of the disk and thus covers up the seed. A fixed scraper $p$ is provided above each disk $a$, nearly or quite touching it, and prevents the soil on the disk from being carried too far forward before leaving the disk.

What we claim is:

1. A disk seed drill wherein the disks are arranged at an acute angle to the horizontal plane and with their forward edges lowest in combination with means for feeding the seed to the underside of the disks.

2. A disk seed drill wherein the disks are arranged at an acute angle to the horizontal plane and with their forward edges lowest, said disks being concave on the underside, in combination with means for feeding the seed to the underside of the disks.

3. A disk seed drill wherein the disks are arranged at an acute angle to the horizontal plane and with their forward edges lowest, in combination with feed tubes leading the seed to the undersides of the disks and deflectors to throw the seed toward the leading edges of the disks.

In testimony whereof, I the said RICHARD NATHANIEL LEA, have signed my name to this specification in the presence of two subscribing witnesses, this 24th day of September 1912.

RICHARD N. LEA.

Witnesses:
W. F. ELLIS,
L. MANNING.

In testimony whereof, I the said FREDERICK MACKENZIE LEA, have signed my name to this specification in the presence of two subscribing witnesses, this 3d day of September 1912.

FREDERICK MACKENZIE LEA.

Witnesses:
E. DAWSON HARDCASTLE,
E. BRETTELL.

---

Copies of this patent may be obtained for five cents each, by addressing the "Commissioner of Patents, Washington, D. C."